(12) United States Patent
Kim et al.

(10) Patent No.: US 10,015,753 B2
(45) Date of Patent: Jul. 3, 2018

(54) SYSTEM FOR DOWNLINK TRANSMISSION USING HETEROGENEOUS POWER

(71) Applicants: Hyungsin Kim, Seoul (KR); Bongsoo Roh, Daejeon (KR); Saewoong Bahk, Seoul (KR); Young-June Choi, Seoul (KR)

(72) Inventors: Hyungsin Kim, Seoul (KR); Bongsoo Roh, Daejeon (KR); Saewoong Bahk, Seoul (KR); Young-June Choi, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 138 days.

(21) Appl. No.: 15/059,688

(22) Filed: Mar. 3, 2016

(65) Prior Publication Data
US 2016/0262115 A1    Sep. 8, 2016

(30) Foreign Application Priority Data

Mar. 4, 2015 (KR) ........................ 10-2015-0030577

(51) Int. Cl.
*H04W 52/28* (2009.01)
*H04W 52/14* (2009.01)
(Continued)

(52) U.S. Cl.
CPC ..... *H04W 52/287* (2013.01); *H04W 52/0219* (2013.01); *H04W 52/143* (2013.01); *H04W 76/27* (2018.02); *Y02D 70/00* (2018.01)

(58) Field of Classification Search
CPC .... H04W 84/18; H04W 56/001; Y02B 60/50; H04L 47/14; H04L 47/24
See application file for complete search history.

(56) References Cited

U.S. PATENT DOCUMENTS

| 2014/0275849 A1* | 9/2014 | Acquista ............. A61B 5/0022 600/301 |
| 2015/0296024 A1* | 10/2015 | Snyder ................. H04W 4/006 340/870.16 |

FOREIGN PATENT DOCUMENTS

| JP | 2010-206724 A | 9/2010 |
| KR | 10-2009-0011304 A | 2/2009 |
| KR | 10-2009-0032319 A | 4/2009 |

OTHER PUBLICATIONS

Kim et al., "Elimination of Multi-hop Transmission from Downlink in Low Power and Lossy Networks", Ad-hoc and Sensor Networking Symposium, IEEE ICC 2014, disclosed on Jun. 9, 2014.

* cited by examiner

*Primary Examiner* — David Oveissi
(74) *Attorney, Agent, or Firm* — Scully Scott Murphy and Presser

(57) ABSTRACT

A system for downlink transmission using heterogeneous power includes a plurality of sensor nodes, a coordinator connected to a network including the plurality of sensor nodes and configured to transmit data to the plurality of sensor nodes, a power source configured to supply power required for the coordinator to transmit data to each of the plurality of sensor nodes through a single transmission passage at a position away by a specific distance from the network, to the coordinator, and a battery configured to supply power required for the plurality of sensor nodes to perform communication within the network, to the plurality of sensor nodes, wherein when a destination node as a reception target of the data, among the plurality of sensor nodes, receives the data, the destination node transmits a signal indicating the data reception to the other remaining nodes among the plurality of sensor nodes.

5 Claims, 4 Drawing Sheets

(51) Int. Cl.
*H04W 52/02* (2009.01)
*H04W 76/27* (2018.01)

SYSTEM FOR DOWNLINK TRANSMISSION USING HETEROGENEOUS POWER

CROSS-REFERENCE TO RELATED APPLICATION

Pursuant to 35 U.S.C. § 119(a), this application claims the benefit of earlier filing date and right of priority to Korean Application No. 10-2015-0030577, filed on Mar. 4, 2015, the contents of which is incorporated by reference herein in its entirety.

BACKGROUND OF THE INVENTION

1. Field of the Invention

The present disclosure relates to a system for supplying power asymmetrically for downlink transmission through a single transmission passage.

2. Background of the Invention

A low power wireless network includes a node operated by battery power, so transmission power thereof is very low. Thus, in order to transmit data to a node positioned in a remote area, a multi-hop transmission is essential, and to this end, routing techniques have been actively studied.

In particular, an existing low power wireless network solution such as a notification system, or the like, mainly features uplink data transmission, and thus, low power wireless network routing techniques have been developed on the based of uplink. For example, starting from a collection tree protocol (CTP) developed by Stanford University in 2009, routing over low power and lossy network (RPL) was standardized as a low power wireless network routing technique, and has since been steadily researched.

Recently, as demand for a low power wireless network system updating information of numerous objects in real time, such as an electronic shelf label (ESL) system, wireless reprogramming, a library books arrangement system, and the like, is on the rise, the necessity of a downlink data transmission technology has increased. However, research has so far focused on uplink, and thus, a downlink technology level is insufficient, and high reliability of data transmission is not guaranteed due to ineffectiveness.

Also, although the RPL, a low power wireless network standard routing technology, supports basic downlink routing, it has large overhead and cannot effectively cope with a change in a channel, which has, thus, failed to be widely used. Thus, for remote downlink transmission without multi-hop routing, a multi-cell network may be established by dividing a wide range into several cells and performing single hop transmission with a sensor node by a coordinator administering each cell. In this network, however, inter-cell interference is so serious that additional development of technology is required and several coordinators need to be installed.

SUMMARY OF THE INVENTION

Therefore, an aspect of the detailed description is to provide a transmission system in which a plurality of sensor nodes are connected by a single network and a coordinator able to transmit data through a single transmission passage (namely, directly) to the network is provided.

Another aspect of the detailed description is to provide a transmission system capable of performing downlink transmission without multi-hop routing, by supplying high power to a coordinator.

To achieve these and other advantages and in accordance with the purpose of this specification, as embodied and broadly described herein, a system for downlink transmission using heterogeneous power may include: a plurality of sensor nodes; a coordinator connected to a network including the plurality of sensor nodes and configured to transmit data to the plurality of sensor nodes; a power source configured to supply power required for the coordinator to transmit data to each of the plurality of sensor nodes through a single transmission passage at a position away by a specific distance from the network, to the coordinator; and a battery configured to supply power required for the plurality of sensor nodes to perform communication within the network, to the plurality of sensor nodes, wherein when a destination node as a reception target of the data, among the plurality of sensor nodes, receives the data, the destination node transmits a signal indicating the data reception to the other remaining nodes among the plurality of sensor nodes.

The plurality of sensor nodes may be maintained in a sleep mode in which transmission and reception of the data or a signal is limited in order to use power received from the battery for transmission and reception of the data or a signal.

The plurality of sensor nodes may be switched from the sleep mode to a reception mode in which at least one of the data and a signal is received, to operate on the basis of a preset period.

The coordinator may repeatedly transmit the data to each of the plurality of sensor nodes during the preset period and calculate a remaining time excluding a time taken for transmitting the data from the preset period, and the data may include information regarding the remaining time.

When data in which the remaining time is zero is transmitted, the plurality of sensor nodes may receive the data, and when data in which the remaining time is not zero is transmitted, the plurality of sensor nodes, without receiving the data, may enter a sleep mode in which transmission and reception of the data is limited until the data in which the remaining time is zero is transmitted.

When the data in which the remaining time is zero is received, the remaining nodes may store the data, and when the signal is received from the destination node, the remaining nodes may delete the stored data, and when the signal is not received from the destination node, the remaining nodes may transmit the stored data to the destination node.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, the present disclosure will be described in detail with reference to the accompanying drawings, in which like numbers refer to like elements throughout although the embodiments are different. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Also, In the following description, usage of suffixes such as 'module', 'part' or 'unit' used for referring to elements is given merely to facilitate explanation of the present invention, without having any significant meaning by itself. Moreover, detailed descriptions related to well-known functions or configurations will be ruled out in order not to unnecessarily obscure subject matters of the present invention.

The present disclosure provides a downlink transmission system in which data may be transmitted through a single transmission passage (i.e., directly) from a position away by a specific distance or longer even without a separate router. Details thereof will be described with reference to FIG. 1.

Figure 1:
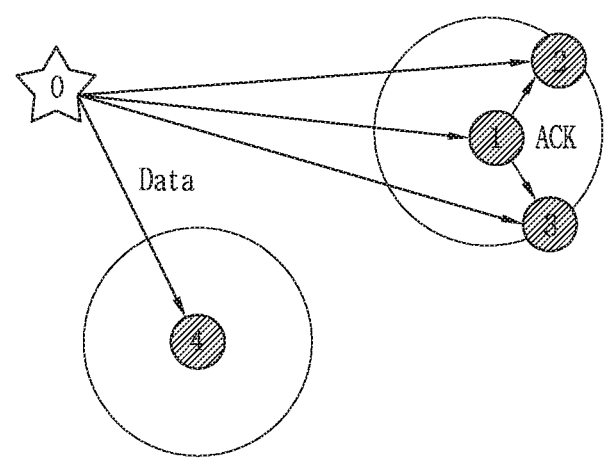
FIG. 1 is a view illustrating an embodiment related to data transmission in a system for downlink transmission using heterogeneous power according to the present disclosure.
Figure 1:
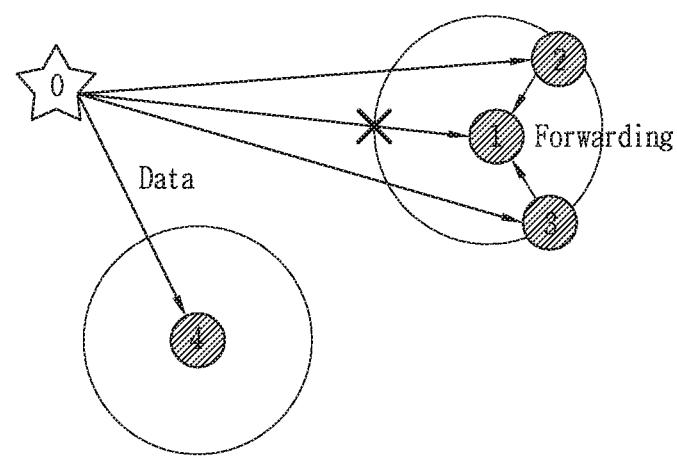

FIG. 1 is a view illustrating an embodiment related to data transmission in a system for downlink transmission using heterogeneous power according to the present disclosure.

First, a transmission system of the present disclosure may include a plurality of sensors 1, 2, 3, and 4, and a coordinator 0 connected to a network including the plurality of sensor nodes 1, 2, 3, and 4.

The coordinator 0 may provide information collected from the plurality of sensor nodes 1, 2, 3, and 4 to a user, or may transfer a user command to the plurality of sensor nodes 1, 2, 3, and 4. The coordinator 0 may transmit data to the plurality of sensor nodes 1, 2, 3, and 4 included in the network at a position away by a specific distance from the network.

To this end, the coordinator 0 may be connected to a power source supplying power required for transmitting data to each of the plurality of sensor nodes 1, 2, 3, and 4 at the position away by the specific distance or longer from the network. That is, since the coordinator 0 is directly connected to a different device such as a computer, or the like, it may be connected to a separate power source that may supply power having a preset magnitude or greater. Thus, the coordinator 0 may transmit data to the plurality of sensor nodes 1, 2, 3, and 4 through a single transmission passage even at a position away by the specific distance or longer from the network, without a separate router.

Alternatively, the plurality of sensor nodes 1, 2, 3, and 4 may be provided with power from a battery that supplies a specific amount of power. Upon receiving power supplied from the battery, the plurality of sensor nodes 1, 2, 3, and 4 may exchange signals with each other within the network. However, transmission of a signal to the coordinator 0 away by a predetermined distance or longer using power supplied from the battery may be limited.

For example, each of the plurality of sensor nodes 1, 2, 3, and 4 may be limited to transmit a signal regarding as to whether data from the coordinator 0 has been successfully received, to the coordinator 0. Thus, the plurality of sensor nodes 1, 2, 3, and 4 may exchange a signal (i.e., acknowledgement (ACK)) regarding whether data has been successfully received from each other.

That is, as illustrated in the first drawing of FIG. 1, the coordinator 0 may transmit data to the plurality of sensor nodes 1, 2, 3, and 4. A destination node 1 as a transmission target of the data, among the plurality of sensor nodes 1, 2, 3, and 4, may transmit a signal indicating that the data has been successfully received, to the other nodes 2 and 3.

If the destination node 1 fails to receive the data from the coordinator 0 as illustrated in the second drawing of FIG. 1, the destination node 1 may not be able to transmit a signal indicating the data has been successfully received, to the other nodes 2 and 3. In this case, the other nodes 2 and 3 may transfer data received from the coordinator 0 to the destination node 1.

In this manner, in the system for downlink transmission using heterogeneous power according to the present disclosure may transmit data at a position, by connecting a separate power source to the coordinator, the coordinator may transmit data at a position away by a specific distance or longer through the single transmission passage, even without multi-hop routing. That is, through a heterogeneous power structure in which a power source different from the power source (battery) supplying power to the plurality of sensor nodes is connected to the coordinator, a downlink transmission system may be implemented by the single transmission passage.

Meanwhile, the plurality of sensor nodes included in the network away from the coordinator by the specific distance or longer may be limited to transmit a response signal regarding data reception to the coordinator using power received from the battery. Thus, the plurality of sensor nodes may exchange signals regarding whether a data has been successfully received with each other, and transfer the data to each other, whereby reliability of data transmission may be enhanced.

In this manner, since the plurality of sensor nodes may be provided with only a specific amount of power from the battery, the plurality of sensor nodes may operate in various modes in order to effectively utilize power. Also, in relation to data received from the coordinator, the plurality of sensor nodes may interact with each other, while operating in the various modes. This will be described with reference to FIG. 2.

Figure 2:
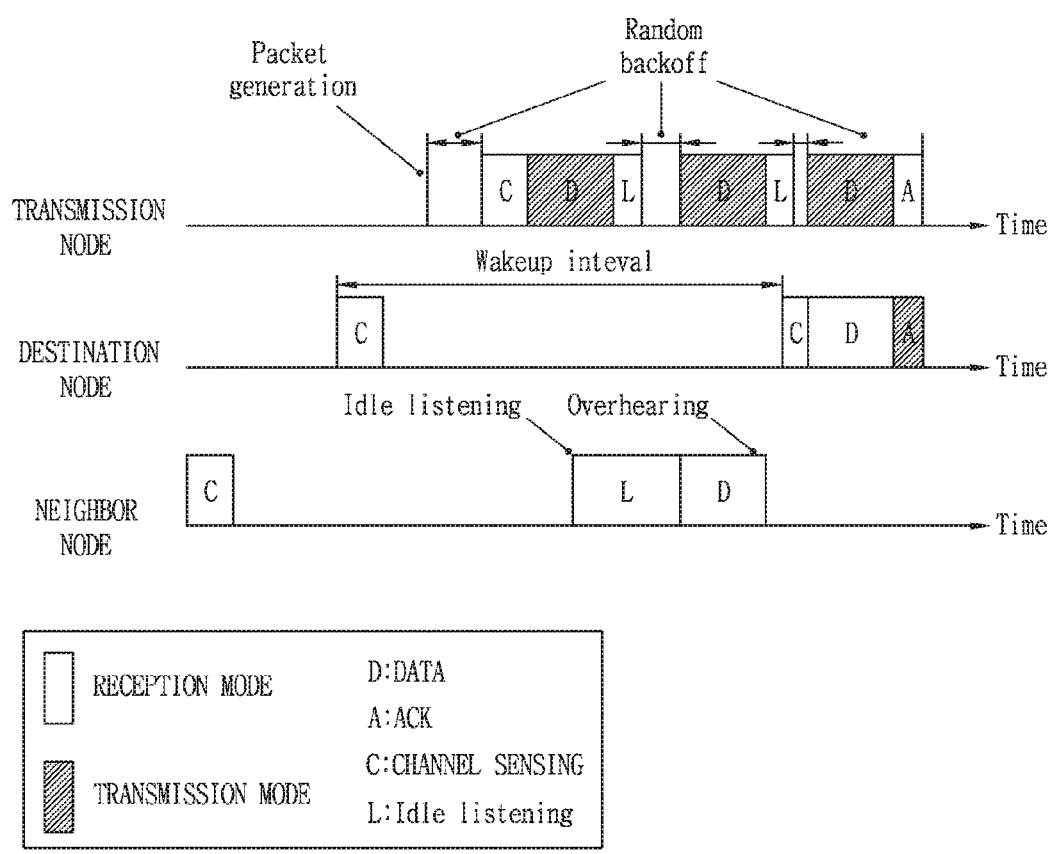
FIG. 2 is a view illustrating sensor nodes playing different roles.

FIG. 2 is a view illustrating sensor nodes playing different roles.

In order to save power, the plurality of sensor nodes may be maintained in a sleep mode in which transmission and reception of data or a signal (i.e., an ACK signal indicating whether a data has been successfully received) are limited. Also, each of the plurality of sensor nodes may be switched from the sleep mode to a reception mode in which data or a signal may be received, on the basis of a preset period (sleep period). Also, each of the plurality of sensor nodes may operate in a transmission mode in which data or a signal may be transmitted.

When the plurality of sensor nodes each receive data from the coordinator, they may analyze information of a destination node as a transmission target of the data. Also, the plurality of sensor nodes may operate as a transmission node or a destination node on the basis of information of the destination node.

In detail, one of the plurality of sensor nodes may receive data from the coordinator. When information regarding a destination node included in the data does not match information of the one sensor node, the one sensor node may transmit the data to another sensor node in a CSMA manner. That is, the one sensor node may operate as a transmission node and repeat a process of random backoff, data transmission, and ACK reception mode during the preset period (sleep period).

When an ACK signal is received in the ACK reception mode, the transmission mode may stop transmission of the data. However, when the ACK signal is not received in the ACK reception mode, the transmission node may determine that data transmission to the destination node has failed, and may retransmit the data to the destination node.

Meanwhile, the destination node may be maintained in the sleep mode, and may be switched to the reception mode on the basis of the preset period. Also, the destination node may receive data from the coordinator or the transmission node in the reception mode.

In a state in which the destination node has been switched to the reception mode, when the data is received, the destination node may receive a signal (ACK signal) indicating that data reception has been successful. In this manner, the destination node is switched to the reception mode at least once during the sleep period, and thus, the plurality of sensor nodes may transmit and receive the data in an asynchronous manner therebetween.

Also, when a different node (a neighbor node of the destination node) which has received the data receives the data, the neighbor node may wait to receive an ACK signal from the destination node. When the ACK signal is not received from the destination node, the different node may transfer the data to the destination node.

In this case, a plurality of other nodes (for example, the aforementioned transmission node) included in the network may simultaneously transfer the data to the destination node. Thus, in order to prevent transmission contention from deepening, the neighbor node may verify an idle state of a channel, and if the different node (the transmission node) is already transmitting the data to the destination node, the neighbor node may stop transmission of the data and delete the data.

In this manner, in order to effectively utilize a specific amount of power (low power) supplied from the battery, the plurality of sensor nodes may be basically maintained in the sleep mode. However, in order to receive the data or a signal, the plurality of sensor nodes may be switched to the reception mode on the basis of a preset period (sleep period). In this manner, since the plurality of sensor nodes, maintained in the sleep mode, are switched to the reception mode at every specific period (sleep period), power supplied from the battery may be effectively utilized.

Also, the coordinator may attempt to transmit data by utilizing the specific period in order to increase a success rate of data transmission to the plurality of sensor nodes operating in the mode. A data transmission method of the coordinator will be described with reference to FIG. 3.

Figure 3:
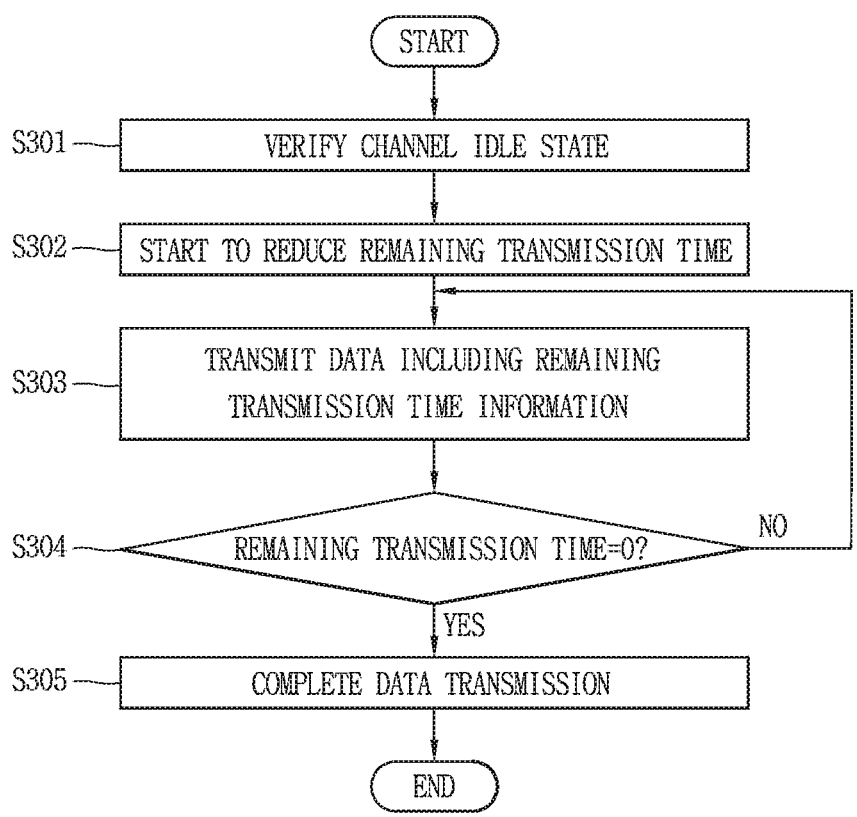
FIG. 3 is a flow chart illustrating that a coordinator transmits data to a plurality of sensor nodes.

FIG. 3 is a flow chart illustrating that a coordinator transmits data to a plurality of sensor nodes.

First, the coordinator may sense a channel and verify whether the channel is valid on the basis of a CSMA scheme (S301).

When the channel is valid, the coordinator may start transmitting data. The data may be transmitted to each of the plurality of sensor nodes repeatedly for a preset period of time. Here, the preset period of time may be identical to a sleep period set in each of the plurality of sensor nodes.

When data transmission starts, the coordinator may start to reduce the preset period of time (remaining transmission time) (S302).

When it starts to reduce the preset period of time (remaining transmission time), it may mean that the preset period of time (remaining transmission time) starts to be counted such that the data may be transmitted only the preset period of time (remaining transmission time). That is, in a case in which the coordinator transmits the data once, the coordinator may starts to calculate a remaining period of time excluding a time taken for the single transmission. If the preset period of time (remaining transmission time) is the sleep period, the coordinator may starts to reduce the sleep period together with transmission of the data.

The coordinator may transmit data including information regarding the remaining transmission time (remaining period of time) to the plurality of sensor nodes (S303).

The remaining transmission time (remaining period of time) included in the data is used for each of the plurality of sensor nodes to receive the data and exchange the data with each other. This will be described in detail with reference to FIG. 4 hereinafter.

When the remaining transmission time (remaining period of time) is not zero, the coordinator may repeatedly transmit the data to the plurality of sensor nodes until the remaining transmission time (the remaining period of time) becomes zero. When the remaining transmission time (remaining period of time) is zero (S304), the coordinator may complete transmission of the data (S305).

The remaining transmission time described in this disclosure may refer to a preset period of time during which the data is repeatedly transmitted. If the coordinator has already started to transmit the data, the remaining transmission time may refer to a remaining period of time excluding a time taken for the data transmission.

In this manner, the coordinator according to an embodiment of the present disclosure may transmit the data in one direction (downlink) at a position away by a specific distance from the network in which the plurality of sensor nodes are included. Also, due to the heterogeneous (or asymmetric) power system, the plurality of sensor nodes may not transmit a response regarding as to whether the data has been successfully received, to the coordinator.

Thus, by utilizing the specific period (sleep period) related to an operation mode of the plurality of sensor nodes, the coordinator may repeatedly transmit the data during the specific period. That is, unlike exchange of data or a signal between the sensor nodes, once the coordinator starts to transmit data, the coordinator may continuously transmit data without channel sensing or backoff during the sleep period. Thus, in the downlink transmission system according to an embodiment of the present disclosure, a success rate of data transmission may be increased.

In this manner, when data is received from the coordinator, each of the plurality of sensor nodes may perform various operations by utilizing information (for example, information regarding a destination node, information regarding a remaining transmission time, and the like) included in the data. This will be described in detail with reference to FIG. 4.

Figure 4:
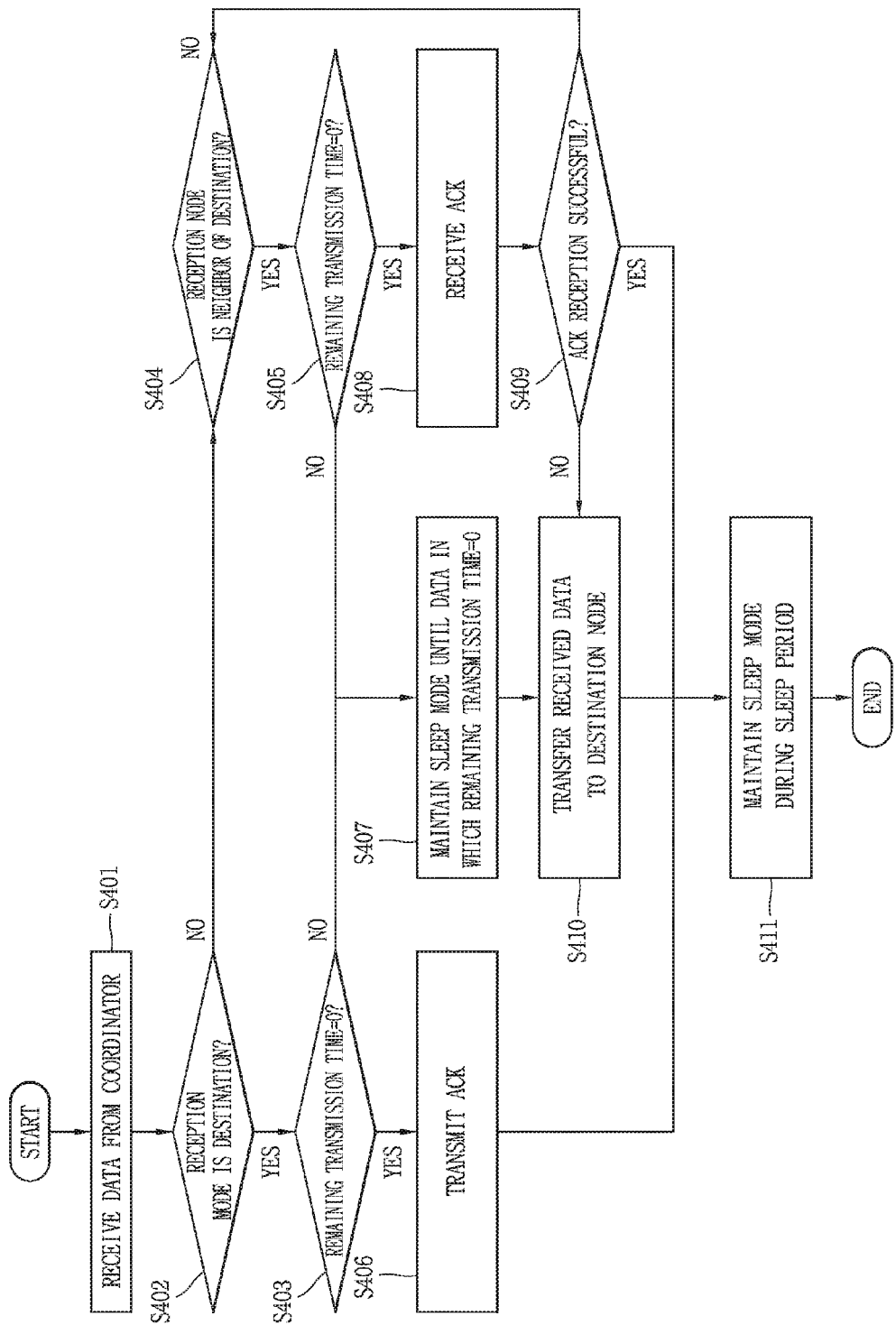
FIG. 4 is a flow chart illustrating that a plurality of sensor nodes analyze information included in received data, and a flow of interaction among the plurality of sensor nodes.

FIG. 4 is a flow chart illustrating that a plurality of sensor nodes analyze information included in received data, and a flow of interaction between the plurality of sensor nodes.

When data is transmitted from the coordinator, the plurality of sensor nodes may receive the data (S401). Here, the plurality of sensor nodes may receive data in a reception mode.

The plurality of sensor nodes may analyze the information regarding a destination node included in the data to determine whether a target node of the data transmission is itself. If a node which receives the data, among the plurality of sensor nodes, is a destination node (S402), the destination node may analyze whether a remaining transmission time (remaining time) included in the data is zero (S403).

When the remaining transmission time (remaining time) is zero, the destination node may receive the data and may transmit a signal (ACK signal) indicating the data reception to the other remaining sensor nodes (S406). After the transmission of the ACK signal, the destination node may be maintained in the sleep mode during the sleep period.

However, if the remaining transmission time (remaining time) is not zero, the destination node may enter the sleep mode without receiving the data, and may be maintained in the sleep mode until data in which the remaining transmission time (remaining time) is zero is received. In other words, in a case in which a remaining transmission time (remaining time) of the received data is t, the destination node may be maintained in the sleep mode for t-δ and switched to the reception mode. Here, δ may be a temporal threshold value to be determined in consideration of a time error that may occur among the plurality of sensor nodes.

Alternatively, in a case in which a node which receives the data, among the plurality of sensor nodes, is not the destination node (in case of a neighbor node of the destination node) (S404), the neighbor node may check whether a remaining transmission time (remaining time) included in the data is zero (S405).

In a case in which the remaining transmission time (remaining time) is not zero, the neighbor node may enter the sleep mode without receiving the data, and may be maintained in the sleep mode until data in which the remaining transmission time (remaining time) is zero (S407). When data in which the remaining transmission time (remaining time) is zero is received, the neighbor node may determine whether an ACK signal has been received from the destination node (S408).

When the ACK signal has been successfully received from the destination node (S409), the neighbor node may delete the received data, enter the sleep mode again, and be maintained in the sleep mode during the sleep period (S411).

However, when the ACK signal is not received (S409), the neighbor node may recognize that the data has not been received by the destination node, and transfer the data to the destination node. Here, by utilizing information regarding a transmission time (remaining time) included in the data, the neighbor node may operate to transfer the data at a point in time at which the destination node is switched to the reception mode. Also, when it is determined that a different node, among the plurality of sensor nodes, already transmits the same data through channel sensing, the neighbor node may stop transmission of the data and delete the data.

As described above, the coordinator may include remaining time information related to the sleep period in the data and transmit the data. Thus, the plurality of sensor nodes may adjust timing of switching of the reception mode thereamong by utilizing only data in which the remaining time information is zero. Also, since the plurality of sensor nodes can be switched to the reception mode on the basis of the preset period (sleep period), power may be effectively used, while a success rate of data transmission is increased.

As described above, since the system for downlink transmission using heterogeneous power according to an embodiment of the present disclosure includes a separate power source for supplying high power to the coordinator that transmits data from a remote area, data may be transmitted through a single transmission passage even without multi-hop routing. Thus, a problem in which overhead is increased may be solved.

Also, in the system for downlink transmission using heterogeneous power according to an embodiment of the present disclosure, on the basis of the fact that data transmission is performed only in a direction from the coordinator to the plurality of sensor nodes, the plurality of sensor nodes may transfer received data therebetween, whereby a success rate of data transmission can be increased.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A system for downlink transmission using heterogeneous power, the system comprising:
   a plurality of sensor nodes;
   a coordinator connected to a network including the plurality of sensor nodes and configured to transmit data to the plurality of sensor nodes;
   a power source configured to supply power required for the coordinator to transmit data to each of the plurality of sensor nodes from the network, to the coordinator; and
   a battery configured to supply power required for the plurality of sensor nodes to perform communication within the network, to the plurality of sensor nodes,
   wherein when a destination node as a reception target of the data, among the plurality of sensor nodes, receives the data, the destination node transmits a signal indicating the data reception to the other remaining nodes among the plurality of sensor nodes,
   wherein the coordinator repeatedly transmits the data to each of the plurality of sensor nodes during a preset period and calculates a remaining time obtained by subtracting a time required for transmission of the data in the preset period, and the data includes information regarding the remaining time.

2. The system of claim 1, wherein the plurality of sensor nodes are maintained in a sleep mode in order to use power received from the battery for transmission and reception of the data or a signal.

3. The system of claim 2, wherein the plurality of sensor nodes are switched from the sleep mode to a reception mode in which at least one of the data and a signal is received, to operate on the basis of a preset period.

4. The system of claim 1, wherein when data in which the remaining time is zero is transmitted, the plurality of sensor nodes receive the data, and when data in which the remaining time is not zero is transmitted, the plurality of sensor nodes, without receiving the data, enter a sleep mode in which transmission and reception of the data is limited until the data in which the remaining time is zero is transmitted.

5. The system of claim 1, wherein when the data in which the remaining time is zero is received, the remaining nodes store the data, and when the signal is received from the destination node, the remaining nodes delete the stored data, and when the signal is not received from the destination node, the remaining nodes transmit the stored data to the destination node.

\* \* \* \* \*